March 10, 1970     K. B. KAISER     3,499,692
HYDROSTATIC BEARING WITH MECHANICAL PROTECTION
Filed Feb. 19, 1968     2 Sheets-Sheet 1
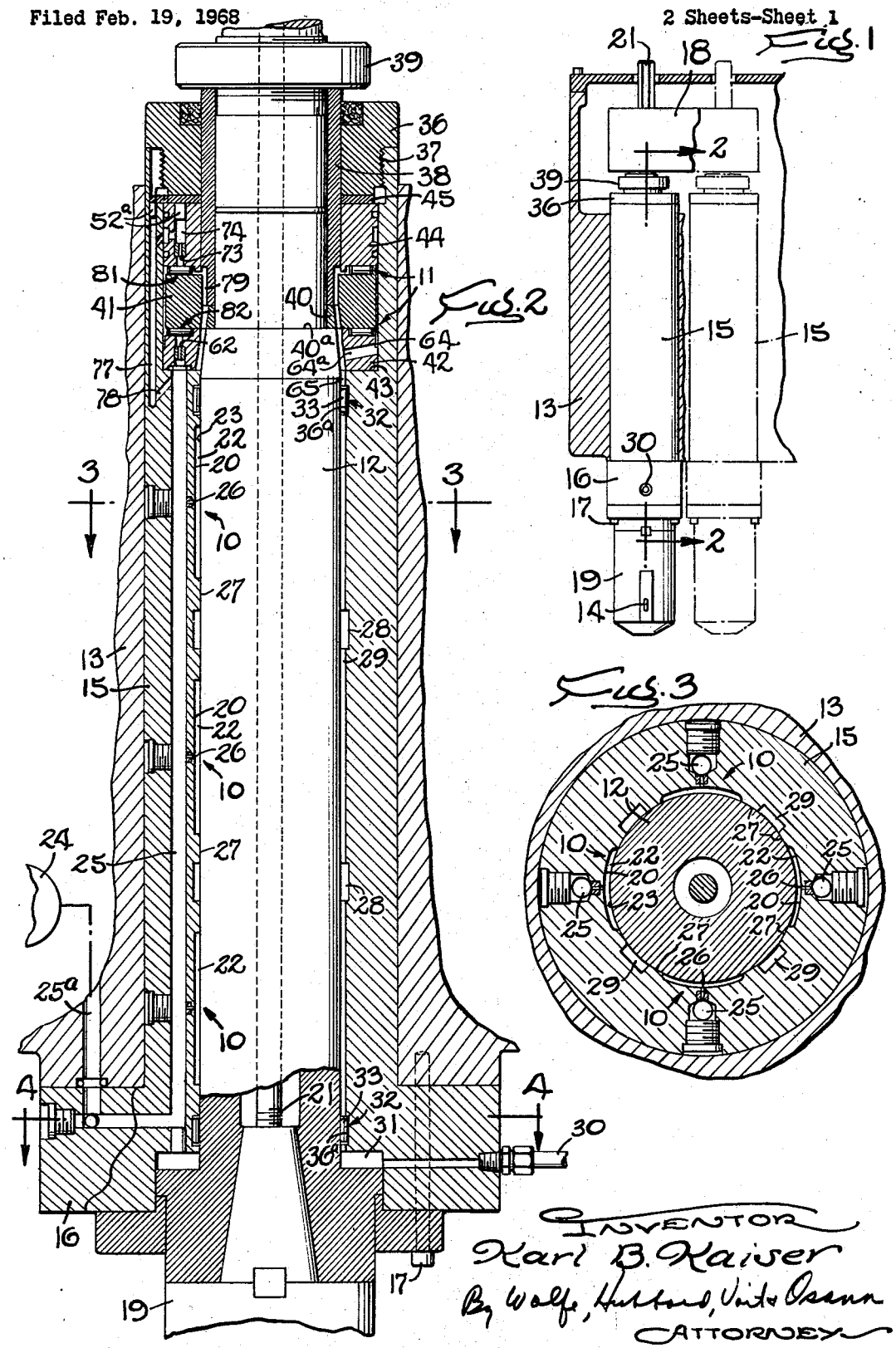
INVENTOR
Karl B. Kaiser
By Wolfe, Hubbard, Voit & Osann
ATTORNEY

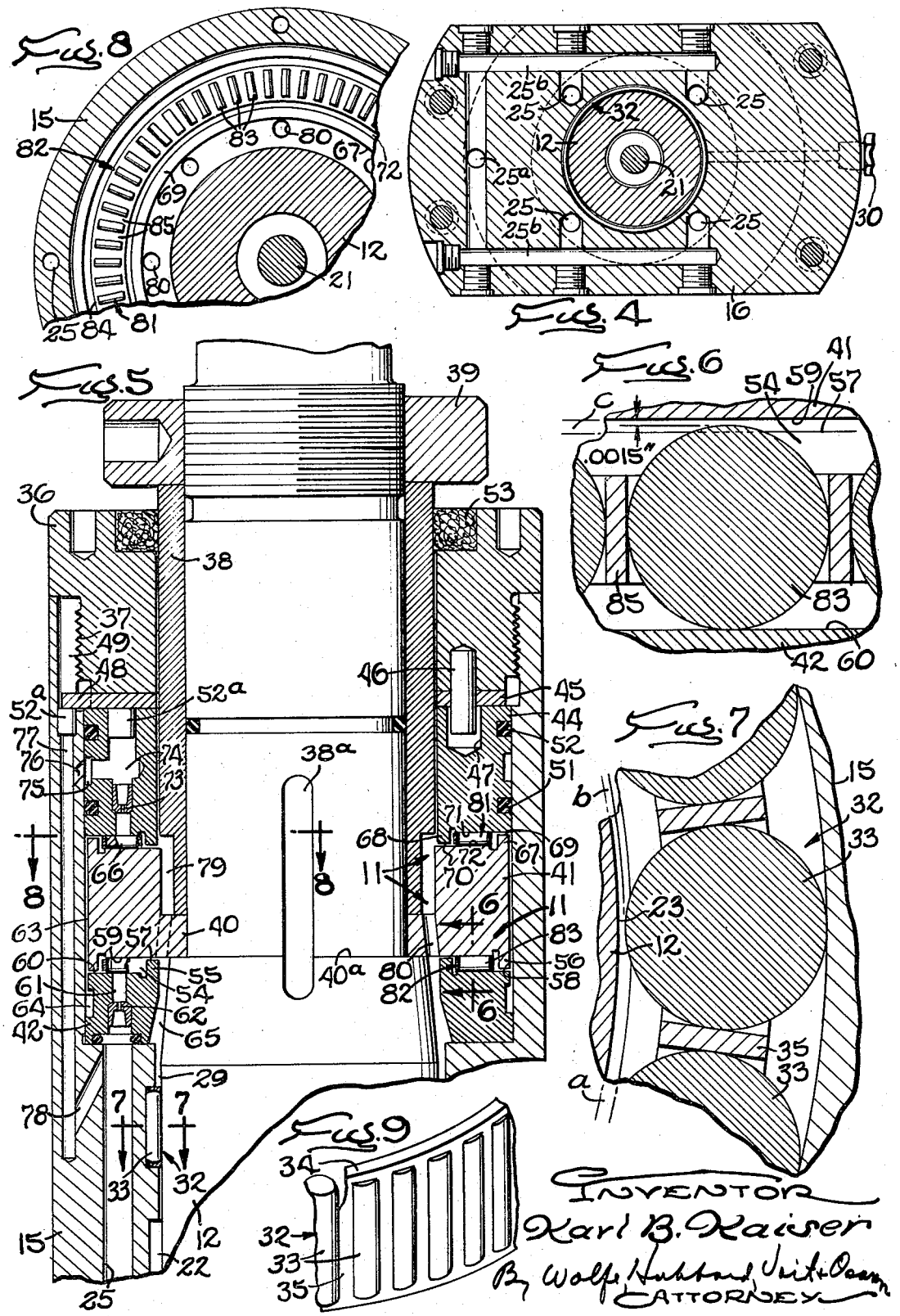

United States Patent Office 3,499,692
Patented Mar. 10, 1970

3,499,692
HYDROSTATIC BEARING WITH MECHANICAL PROTECTION
Karl B. Kaiser, Rockford, Ill., assignor to The Ingersoll Milling Machine Company, Rockford, Ill., a corporation of Illinois
Filed Feb. 19, 1968, Ser. No. 706,372
Int. Cl. F16c 17/16, 17/06
U.S. Cl. 308—9                  10 Claims

ABSTRACT OF THE DISCLOSURE

A tool spindle is rotatably supported within a surrounding sleeve and by an end thrust plate through the medium of conventional hydrostatic bearings comprising opposed fluid pressure recesses or pads in the thrust plate and spaced around the interior of the sleeve, each pad being surrounded by a sill area coacting with an opposed surface rotatable with the spindle to provide a narrow clearance through which fluid supplied under high pressure is forced through compensating orifices to the respective opposed pads and flows outwardly across the sill area. Between opposed surfaces on the spindle and the sleeve and thrust plate are interposed rigid antifriction bearings having a clearance with such surfaces which is slightly less than said sill clearance so that the mechanical bearing normally floats between the opposed surfaces of the sleeve and spindle and remains unloaded and inactive. But if the hydraulic pressure necessary to support the spindle hydrostatically fails or if the working load exceeds the capacity of the hydrostatic bearing, the mechanical bearing becomes effective to support the spindle and thus prevent damage to the opposed surfaces of the spindle, the sleeve, and the thrust plate during continued rotation of the spindle.

BACKGROUND OF THE INVENTION

This invention relates to a bearing for hydrostatically supporting one part such as a shaft for rotation relative to another part and comprising a plurality of oppositely opening recesses or so-called pads in one part each surrounded by a sill area normally spaced from an opposed surface on the other part by a narrow clearance through which hydraulic fluid, delivered at high pressure to the pads, flows outward continuously to provide a frictionless bearing supporting one of the parts from the other.

SUMMARY OF THE INVENTION

In accordance with the present invention, a rotatable shaft or spindle is supported under all normal load conditions solely by hydrostatic pressurized fluid and, in spite of normal load variations, is held in a precisely centered position. This is accomplished through the provision on the supporting one of the relatively rotatable parts of a plurality of recesses or pads opening toward the rotating part from opposite sides thereof and supplied through individual orifices with fluid under sufficient pressure to maintain a continuous lateral flow outwardly through the narrow sill clearances between the two parts and surrounding each of the recesses. Through the compensating action of the orifices, adjustments are made automatically in the opposed supporting pressures exerted on the rotating part by the fluid in the pad areas and flowing continuously through the surrounding sill clearances thus providing a frictionless support for the shaft while holding the same centered precisely under normal load conditions.

In combination with a hydrostatic bearing of the above character, the present invention provides between opposed surfaces on the hydrostatically supported and relatively movable parts rigid mechanical bearing elements having a clearance with opposed surfaces of the two parts which is slightly less than the sill clearance of the hydrostatic support so as to remain out of effective engagement with such surfaces during rotation of the supported part under normal loading when such part is supported solely by the forces exerted thereon hydrostatically as above described. Thus, if the pressure for the hydrostatic bearing fails or is reduced substantially or if the working load exerted on the spindle exceeds the capacity of such bearing, the mechanical bearing then and only then becomes effective automatically to hold the opposed sill surfaces of the hydrostatic bearing out of rubbing contact thereby preventing possible damage to these surfaces during continued relative movement between the parts even at relatively high speed.

In the case of a radial hydrostatic bearing, the mechanical bearing is disposed in an internal annular groove around the interior of the sleeve and concentric with the axis thereof. For sustaining axial thrust on the rotating part, flat end surfaces of an axially floating ring on the rotatable part are concentric with the rotational axis thereof and cooperate with opposed sill areas surrounding hydrostatic pressure pads to form oppositely acting hydrostatic bearings. As in the case of the radial bearings, these hydrostatic thrust bearings are protected by mechanical bearings of lesser clearance than the hydrostatic sill clearances and interposed between opposite ends of the floating ring and opposed surfaces on the nonrotatable part. Preferably, these mechanical thrust bearings are disposed within continuous annular grooves which form the pressure pads of the hydrostatic thrust bearings.

BRIEF DESCRIPTION OF THE DRAWINGS

FIGURE 1 is a cross-sectional view through a boring head equipped with boring spindles mounted in hydrostatic bearings embodying the novel features of the present invention.

FIG. 2 is an enlarged fragmentary section taken along the line 2—2 of FIG. 1.

FIGS. 3 and 4 are fragmentary sections taken along the lines 3—3 and 4—4 of FIG. 2.

FIG. 5 is an enlargement of a part of FIG. 2.

FIGS. 6 and 7 are fragmentary sections on an enlarged scale taken along the lines 6—6 and 7—7 of FIG. 5, the clearances shown being on an exaggerated scale.

FIG. 8 is a section taken along the line 8—8 of FIG. 5.

FIG. 9 is a fragmentary perspective view of one of the mechanical bearings.

DESCRIPTION OF THE PREFERRED EMBODIMENT

While the invention may be utilized in conjunction with hydrostatic bearings for supporting rectilinearly or arcuately movable parts, it is shown in the drawings for purposes of illustration incorporated in radial and axial hydrostatic bearings 10 and 11 for supporting a spindle 12 in a boring head 13 and for sustaining end thrust on the spindle as the head is advanced to feed a tool 14 on the projecting end portion of the spindle into the bore to be enlarged in a workpiece. It is to be understood however that I do not by such disclosure intend to limit the invention but aim to cover all alternative constructions and uses falling within the spirit and scope of the invention as expressed in the appended claims.

Preferably, the spindle 12 extends through and is adapted for limited axial floating in a sleeve 15 telescoped in the head and having an end flange 16 clamped by bolts 17 to the head. Beyond the upper end of the sleeve, the spindle carries a pulley driven from a suitable source of rotary power through means such as a toothed belt 18. The boring tool is on an extension 19 of the spindle keyed to the lower end thereof and drawn into a socket in the spindle end by a tie bolt 21.

To facilitate manufacture and assembly, a ring 36 is threaded at 37 into the upper end of the sleeve and around a tube 38 telescoped over the upper end of the spindle and coupled thereto by a key 38a. By means of a nut 39 threaded onto the spindle beyond the sleeve, the tube 38 is clamped to a shoulder 40a on the spindle through the medium of an inturned flange 40 on ring 41 forming part of the thrust bearing later to be described.

The radial hydrostatic bearings 10 are spaced axially along the spindle and each is constructed in accordance with well-known design techniques. Herein each comprises four pressure pads in the form of shallow recesses 22 angularly spaced around the latter and supplied with hydraulic fluid under high pressure, for example 1,000 p.s.i. Each pad recess is rectangular in shape and formed in the inner wall of the sleeve 15 with an arcuate bottom 20 and opening toward the cylindrical outer surface 23 of the spindle. A continuous flow of oil at substantially constant pressure is delivered by a pump 24 (FIG. 2) to the pads through a supply line 25a and passages 25b (FIGS. 4 and 5) to upright passages 25 angularly spaced around and extending along the sleeve 15. These passages are connected to the branch passages leading to the respective pads through compensating elements in the form of orifices 26 whose diameter, for example .025 of an inch, may be fixed or if desired, varied in a well-known manner to provide a constant pressure drop across the orifice.

Each of the pads 22 is surrounded by a sill area 27 spaced from the opposed surface 23 of the spindle to provide a clearance $a$, for example, .002 of an inch thick, communicating with drain grooves 28 extending around the inner wall of the sleeve and connected to angularly spaced longitudinal slots 29 leading to a groove 31 around the lower end of the spindle and sleeve. Through a pipe 30, the drainage may be returned to a sump in any suitable way.

With hydrostatic bearings of the above character, the flow of pressure fluid to the pads 22 balances the escape of fluid outwardly through the laminar flow passages or sill clearances $a$. The spindle is thus supported rigidly by the fluid in the pads and floats thereon both radially and axially so that, in the manner well understood in the art, the spindle is always centered precisely in the sleeve in spite of fluctuating radial loads imposed on the spindle in the course of a boring operation.

In accordance with the present invention as applied to the radial bearings above described, rigid mechanical bearings 32 are mounted between opposed surfaces of the spindle 12 and sleeve 15 with clearances $b$ (FIG. 7) slightly less, for example .001 of an inch, than the still clearances $a$ of the hydrostatic bearings. In certain applications, these bearings 32 may be rings of solid metal such as bronze or Oilite composition differing from the metal of the sleeve and spindle surfaces. For high speed and precision spindle mountings, conventional antifriction bearings are preferably employed with angularly spaced elements journaled in a suitable cage. Herein, each bearing 32 is an annulus comprising rollers 33 journaled at opposite ends in the cage rings 34 joined by spacers 35 between the adjacent rollers. A plurality of such mechanical bearings are, like the hydrostatic bearing pads 22, spaced apart axially along the spindle each being disposed in an annular groove 36a formed in the inner wall of the sleeve 15. These grooves may extend across the drain slots 29 above described.

By making the clearance $b$ between the rollers 33 and the opposed surfaces of the spindle 12 and sleeve 13 slightly less than the sill clearance $a$ of the hydrostatic bearings 10, it will be apparent that the mechanical bearing remains unloaded and therefore inactive while the hydrostatic bearings are effective by the supply of hydraulic fluid thereto at the intended pressure. Thus, the bearing annulus floats frely within the groove 36a and does not normally contribute lateral support to the spindle. But if the supply pressure fails or for some reason is reduced substantially or if the working radial load becomes excessive for any reason, the rollers 33 become effective to hold the opposed surfaces of the spindle and sleeve out of rubbing contact at all points around the spindle. Damage to the sill and spindle surfaces is thus prevented during continued rotation of the spindle.

To provide the desired hydrostatic support for resisting end thrust on the spindle 12 during a boring operation, the bearing 11 is divided into two parts disposed on opposite sides of the axially floating ring 41 which is clamped to the spindle shoulder 40a as above described and which is disposed above a ring 42 seated on and sealed against a shoulder 43 in the upper countersunk end of the sleeve 15. Above this ring and sealed within the sleeve is a ring 44 which is coupled to the sleeve through the medium of a flat spacer ring 45 disposed between this ring and the inner end o fthe sleeve nut 36. The coupling is effected by pins 46 on the ring 45 projecting into holes 47 in the ring 44 and ears 48 projecting into longitudinal grooves 49 in the internal wall of the outer part of the sleeve. Seals 51, 52, 53 and plugs 52a properly confine the fluid supplied to and escaping from the hydrostatic bearings 11.

The lower part of the hydrostatic bearing 11 includes a pad which in the present instance and for a purpose to presently appear comprises a continuous annular groove 54 (FIG. 5) formed in the upper end of the ring 42 and having an inner wall defined by a peripheral rib 55 upstanding from the inner edge of the ring. The outer wall of the pad is a defined rib 56 depending from the outer periphery of the floating ring 41. Thus, the end surfaces 57, 58 of the ribs 55, 56 provide sill areas on opposite sides of the groove 54, the areas being spaced from the opposed surfaces 59, 60 of the rings 41 and 42 so as to provide a sill clearance $c$ (FIG. 6) which, in the final assembly, is preferably about .002 of an inch.

High pressure fluid from the sleeve passages 25 is supplied through passages 61 to the continuous annular pad defined by the groove 54 between the ribs 55, 56. The flow is through a compensating element in the form of a restriction or orifice 62. With the pad thus pressurized, fluid flows continuously from the pad outwardly across the sills 57 and 58 to drain passages 63 surrounding the rings 41, 42 and leading downwardly to a groove 64 communicating through one or more radially extending passages 64a in the ring 42 with annular passages 65 between the spindle and the ring and communicating with the upper ends of the drain passages 29 above described. Fluid escaping outwardly across the sill 69 is received in the upper end of the drain clearance 63 while the fluid escaping across the sill 70 is received in a groove 79 which communicates through ports 80 with the inner drain groove 64.

A similar annular pressure pad 66 is formed in the upper end of the floating ring 41 between an upstanding outer rib 67 thereon and an inner rib 68 depending from the ring 44. The ends 69, 70 of the ribs constitute sill areas and are spaced from the opposed flat surfaces 71, 72 of the rings 41 and 44 to provide narrow clearances of .002 of an inch around the inner and outer edges of the pad. The latter is supplied with pressure fluid through a compensating restriction 73 in a passage 74 communicating through a groove 75 around the exterior of the ring 44 and a port 76 with a hole 77 in the upper end portion of the sleeve 15. The hole is connected at its lower end and through a passage 78 with one of the high pressure supply passages 25. The lower and upper hydrostatic pads 54, 66 are thus connected together and maintained at the same high pressure.

It will be apparent that by proper adjustment of the nut 36 and by virtue of the free axial floating of the ring 41 and spindle, the sill clearances of the upper and lower hydrostatic bearings 11 may be adjusted to provide a total clearance of .004 of an inch. This means that when the spindle is not under an endwise thrust, the outward flows across the upper and lower sills 57, 58 and 69, 70 will be equalized and the floating ring 41 which is rigid with the spindle will be centered between the rings 42 and 44. Now, if an upward thrust is exerted on the spindle as during a boring operation, the increased pressure in the upper pad 66 is accompanied by a decrease in its sill clearances while the pressure in the lower pad 54 is decreased correspondingly along with an increase in the sill clearance of this pad. As a result, the ring 41 is forced downwardly until the pressure in the pads is equalized, the ring 41 thus being centered again. Thus, the spindle is always held hydrostatically in a predetermined axial position.

As in the case of the hydrostatic radial bearings above described, mechanical bearings 81 and 82 are disposed between opposite ends of the floating ring 41 and the opposed surfaces of the rings 42 and 44 and provided with clearances which in the final assembly are slightly less than the clearances across the sills of the hydrostatic bearings 11. If, for example, a sill clearance of .002 of an inch is employed in each hydrostatic bearing. .0015 would be a suitable clearance for the mechanical bearings as indicated in FIG. 6. By making the hydrostatic pads in the form of continuous annular grooves concentric with the spindle axis, it is possible to employ, as each mechanical bearing 81, 82, conventional anti-friction thrust bearings each comprising an annular series of rollers 83 extending radially across the grooves and hydrostatic pads as shown in FIG. 8. The rollers are journaled at opposite ends in the rings 84 of a conventional cage connected by spacers 85 between the adjacent rollers.

The rollers 83 are made slightly smaller in diameter than the depth of the pad 54 or 66 in which they are disposed plus the sill clearance around the pad, this difference usually being, as indicated in FIG. 6, about .0015 of an inch when a sill clearance of .002 is provided for the hydrostatic bearing. This small difference is determined accurately through the use of the flat spacer ring 45 above described together with precise machining of the surfaces 59, 60, 71 and 72 precise distances below the surrounding sill surfaces. The final sill clearances are determined by the thickness of the precisely machined spacer ring 45 which is positioned accurately in the final assembly by turning the plug 36 into tight abutment with the upper end of the sleeve 15 as shown in FIG. 5. Accurate machining of the bearing surfaces 59, 60, 71 and 72 is facilitated by forming the hydrostatic pads between the ribs 55, 56 and 67, 68 which project in opposite directions from the adjacent pairs of rings 41, 42 in the case of the lower groove 54 and 41, 44 for the upper groove 66.

It will be apparent that when the upper and lower pads 54 and 66 are under high pressure, the lower and upper rings 42 and 44 will be pressed against the sleeve abutment 43 and the spacer 45 respectively thus establishing the desired sill clearances around both of the pads. At this time and so long as the high pressure continues, the rollers will be out of rubbing contact with the opposed surfaces 58, 59, 71, 72 and, because of the clearances with these surfaces, the rollers will remain unloaded and will float freely within the pads. But if the fluid pressure fails or is reduced substantially or, if the load for which the hydrostatic bearing is designed to withstand, is exceeded in service use, the sill clearances will be reduced when the spindle is under axial thrust thus allowing the rollers to engage the opposed pad surfaces and hold the sill surfaces positively out of rubbing contact. End thrust on the spindle is sustained and the spindle may continue to rotate without danger of damage to these surfaces.

By disposing the bearing rollers 83 within the hydrostatic bearing pads 54, 66 it will be apparent that a high degree of radial compactness is achieved in the hydrostatic thrust bearing structure. In some instances where the thrust bearing is required to resist tilting of the spindle, a plurality of pads angularly spaced apart around the spindle would be used to form each of the hydrostatic bearings 11 above described. For such an application, the bearing rollers 83 would, as in the case of the radial bearing rollers 33 above described, preferably be disposed in separate grooves concentric with the spindle axis and the annular series of hydrostaic bearing pads.

It will be apparent that the hydrostatic bearings 10 and 11 provide radial and axial support for the spindle 12 and, solely by hydrostatic action, hold the latter centered precisely under the loads normally encountered in service use. In the case of the radial bearings, the centering is achieved by the provision of at least three hydraulically pressurized recesses or pads 22 uniformly spaced around the interior of the sleeve 15 and coacting with the continuous fluid flows outwardly through the surrounding clearances to exert opposed forces on the spindle 12 which, in response to changes in the radial loading of the spindle, are adjusted through the essential action of the compensating orifices 26 to maintain the spindle centered precisely at all times under normal loads and in spite of normal variations thereof. The spacing of the opposed sill areas is greater than the radial thickness of the clearances around the rollers 33 of the mechanical bearings so that the latter do not contribute to the radial support of the spindle under normal loads, the oppositely directed forces exerted on the spindle by the high pressure fluid in the pad recesses and in the surrounding sill areas providing the sole support for the spindle in sipte of variations in the radial loading of the latter. Thus the mechanical bearings come into play only when there is a substantial reduction in the supply pressure to the hydrostatic bearings or when the loading thereof, due to some abnormality, exceeds the design capacity of the hydrostatic bearings.

Similar opposing forces are exerted on the floating ring 41 to sustain the end thrust exerted on the spindle, these forces being derived and adjusted with thrust load changes through the interaction of annular pressurized pads at opposite ends of the ring, the continuous flow of fluid through the surrounding areas and the flow restricting orifices 62 and 73. Thus, the clearance differences between the sill areas and that around the mechanical bearings 66 is taken up and these bearings become active only in response to a substantial reduction in the supply pressure to the hydrostatic bearing pads or the application of excessive and abnormal endwise thrust on the spindle.

I claim:

1. The combination of, supporting and rotatable parts mounted for relative rotation and having opposed relatively rotatable surfaces, a pressurized hydrostatic bearing separating said surfaces comprising a plurality of recesses or pads on the supporting part opening toward opposite sides of said rotatable part, means continuously supplying high pressure fluid to the respective recesses through individual flow restricting orifices, the opposed surface areas of said parts surrounding each of said recesses being separated by a sill clearance of narrow thickness adapted for the continuous outward and lateral flow of pressure fluid therefrom whereby said recesses and said orifices coact to provide opposed hydrostatically applied forces urging said rotatable part to a normally centered position relative to the supporting part while adjusting the opposed forces in response to the changes in the load on the rotatable part so that the rotatable part is supported entirely hydrostatically and in said centered position when such part is under normal load, and a rigid mechanical bearing interposed between opposed surfaces of said parts and having a clearance with said surfaces which is slightly less than said sill clearance so that the mechanical bearing remains inactive under normal loads on said rotatable part but becomes effective in response to a substantial and abnormal reduction in the pressure of the fluid supplied to said recesses and thereafter maintains the opposed surfaces defining the sill areas of said hydrostatic bearing out of rubbing contact during the continued rotation of the rotatable part.

2. The combination defined in claim 1 in which said sill clearance is on the order of .002 of an inch and said mechanical bearing clearance is substantially less than such sill clearance.

3. The combination as defined in claim 1 in which said rotatable part is a shaft telescoped in a non-rotatable sleeve having at least three of said recesses formed therein and angularly spaced around the interior thereof.

4. The combination as defined in claim 3 in which said hydrostatic bearing includes a plurality of series of angularly spaced pressure pads axially spaced along said shaft and said mechanical bearing includes a plurality of rigid annuli spaced axially along the shaft from said pads.

5. The combination as defined in claim 1 in which said pressurized recesses are annular grooves spaced axially and disposed at opposite ends of a ring fixed to said rotatable part.

6. The combination as defined in claim 1 in which said recesses comprise annular grooves opening axially toward said ring and each having one of said mechanical bearings disposed therein.

7. The combination of, a non-rotatable sleeve, a rotary shaft telescoped within said sleeve, a pressurized hydrostatic bearing supporting said shaft from said sleeve in a normally centered position relative thereto and having a continuous sill clearance of a few thousandths of an inch, such bearing including recesses angularly spaced and distributed around the interior of said sleeve and opening toward the surface of said shaft, means supplying hydraulic fluid to the respective recesses through flow restricting orifices and at a sufficiently high pressure to maintain a continuous outflow from each recess through the sill clearance surrounding such recess, and a rigid bearing annulus surrounding said shaft and disposed between opposed surfaces of said sleeve and the shaft, the bearing annulus having a clearance with such opposed surfaces less than said sill clearance whereby the bearing is normally unloaded and remains inactive but is activated upon a substantial reduction in such pressure or when the hydrostatic bearing is overloaded abnormally whereby the annulus engages the surfaces of both said sleeve and shaft and supports the shaft with the surfaces defining said sill clearances out of mechanical contact with each other.

8. The combination of, a non-rotatable sleeve, a rotary spindle telescoped within the sleeve, a pressurized hydrostatic bearing supporting said spindle including an annular series of pads and surrounding sill surfaces on the interior of said sleeve cooperating with the opposed surface of the spindle to rotatably support the latter while permitting some degree of axial shifting thereof, a hydrostatic bearing for sustaining end thrust exerted on said spindle and comprising a ring fixed to and projecting outwardly from said spindle, a second ring rotatable with and axially fixed to said sleeve and disposed adjacent one end of said first ring, opposed and axially spaced surfaces on the adjacent ends of said rings, radially spaced side walls cooperating with said surfaces to form a continuous annular groove surrounded by sills having a narrow clearance with the opposed ring surface whereby to form an axially facing and annular hydrostatic bearing pad, means for pressuring all of said pads whereby to support the spindle hydrostatically in both radial and axial directions, said opposed surfaces on said rings between said side walls forming opposed bearing raceways, and an annular series of anti-friction elements disposed between said raceways and adapted for rolling engagement therewith, said elements having a diameter slightly less than the spacing of said raceways when said bearing pads are fully pressurized but permitting engagement of the elements and raceways in response to a substantial reduction in the pressure in such pads whereby to hold the sill areas of said rings out of mechanical contact during rotation of the spindle.

9. The combination of, a non-rotatable sleeve, a rotary spindle journaled in and extending through the sleeve, a hydrostatic bearing for sustaining end thrust exerted on said spindle and comprising a ring fixed to and projecting outwardly from said spindle, a second ring axially fixed on said sleeve and disposed adjacent one end of said first ring, opposed and axially spaced surfaces on the adjacent ends of said rings, radially spaced side walls cooperating with said surfaces to form a continuous annular groove surrounded by sills having a narrow clearance with the opposed ring surface whereby to form an axially facing and annular hydrostatic bearing pad, means for supplying fluid to said pad under sufficient pressure to maintain a continuous flow of fluid edgewise across said sills and thereby hold said rings out of rubbing contact under the end thrust exerted on the spindle, said opposed surfaces on said rings between said side walls forming opposed bearing raceways, and an annular series of anti-friction elements disposed between said raceways and adapted for rolling engagement therewith, said elements having a diameter slightly less than the spacing of said raceways when said thrust bearing pads are fully pressurized but permitting engagement of the elements and raceways in response to a substantial reduction in the pressure in such pads whereby to hold the sill areas of said rings out of contact during rotation of the spindle.

10. The combination defined in claim 9 in which one of said pad side walls is rigid with one of said rings and the other wall is rigid with the other ring.

References Cited

UNITED STATES PATENTS 3,065,036  11/1962  Trotter _____ 308—35

FOREIGN PATENTS 456,240  4/1949  Canada.

MARTIN P. SCHWADRON, Primary Examiner

FRANK SUSKO, Assistant Examiner

U.S. Cl. X.R.

308—35, 160